Figure 1:
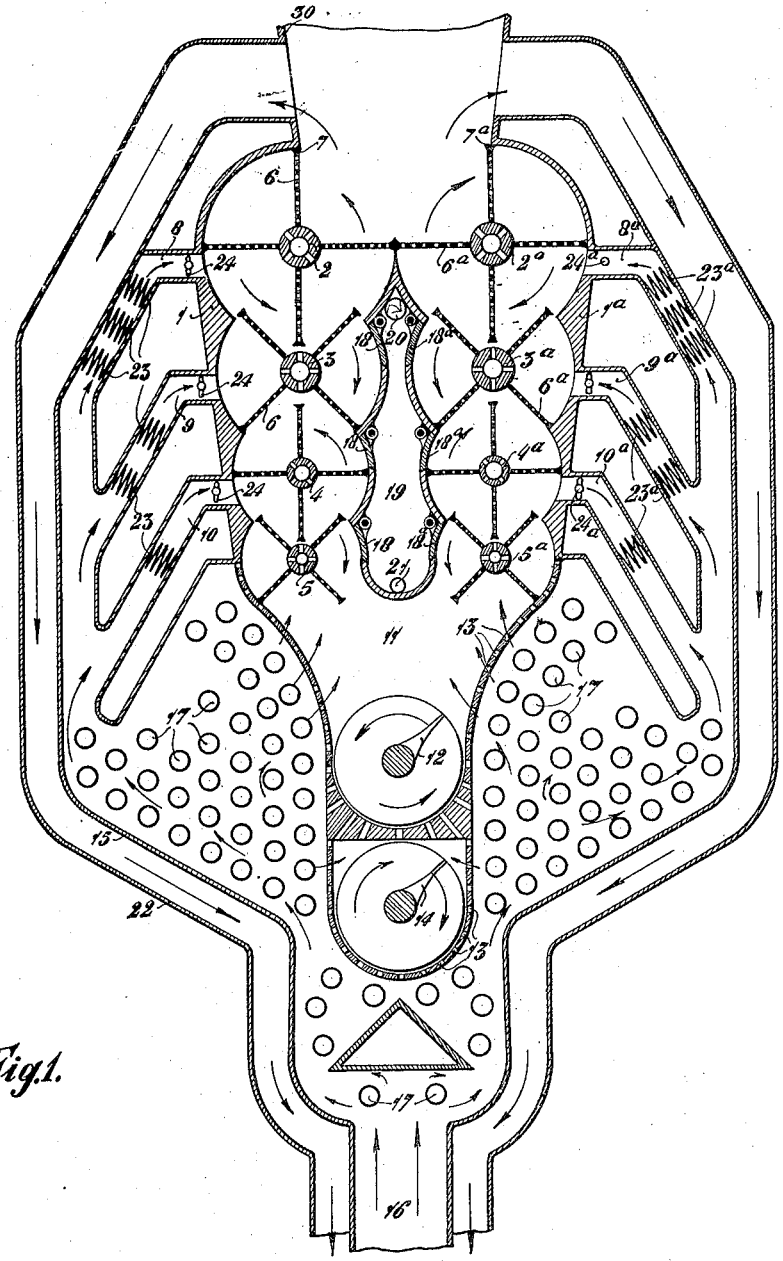

D. J. PENNOCK.
METHOD AND APPARATUS FOR DRYING STEAMED OR BOILED VEGETABLES.
APPLICATION FILED JUNE 19, 1918.

1,317,215.

Patented Sept. 30, 1919.
3 SHEETS—SHEET 2.

Dominicus Josephus Pennock
Inventor
by Laurence Langue
Attorney

Dominicus Josephus Pennock
Inventor

UNITED STATES PATENT OFFICE.

DOMINICUS JOSEPHUS PENNOCK, OF ZEVENBERGEN, NETHERLANDS.

METHOD AND APPARATUS FOR DRYING STEAMED OR BOILED VEGETABLES.

1,317,215.  Specification of Letters Patent.  Patented Sept. 30, 1919.

Application filed June 19, 1918. Serial No. 240,742.

*To all whom it may concern:*

Be it known that I, DOMINICUS JOSEPHUS PENNOCK, a subject of the Queen of the Netherlands, residing at Zevenbergen, the Netherlands, have invented certain new and useful Improvements in Methods and Apparatus for Drying Steamed or Boiled Vegetables, of which the following is a specification.

When drying steamed or boiled vegetables by means of air in accordance with the counter-current principle allowance is to be made for the fact that at the outlet for the dried vegetables, that is the inlet for the drying air, the temperature may not exceed about 70° C., as air heated to a higher temperature would have an undesired effect on the dried material. On this account it is impossible to use air having a temperature exceeding about 70° C., which from an economical point of view is very inconvenient as air of this comparatively low temperature cannot contain any considerable quantity of moisture, so that the quantity of air to be used must be excessively great. As a matter of fact it may be stated that one cubic meter of air of 70° C. cannot contain more than 0.22 kilos of water, whereas one cubic meter of air of 100° C. may contain 0.73 kilos of water, assuming in both cases a saturation of 90%.

The present invention has for its object to minimize the quantity of air per kilo of vegetables to be dried, and, consequently, the power required for driving the fans. In accordance with the invention this object may be attained by allowing the steamed or boiled vegetables to slowly move through a space, into which air is introduced at different points between outlet and inlet for the vegetables, the temperature of said air increasing gradually from outlet to inlet. In this manner it is possible for the air introduced to always have the maximum temperature which the vegetables can stand in connection with their degree of moisture at that particular point. As a matter of course the air introduced at the outlet for the vegetables will be given a temperature of about 70° C. whereas near the inlet the temperature of the drying air may be 100° C. or even somewhat higher, as the material entering the apparatus contains so much moisture and is so hot owing to the previous steaming or boiling that it cannot be damaged by air heated to this temperature.

The invention further relates to apparatus for carrying the new method into effect. The annexed drawing shows by way of example, and somewhat diagrammatically, an embodiment of the invention, Figure 1 being a cross sectional elevation, Fig. 2 a front perspective view, and Fig. 3 a rear perspective view of the apparatus.

Referring to Fig. 1, the apparatus comprises two identical vertical casings 1, 1$^a$, tapering from top to bottom. Vertically above these casings there is a feed hopper 30 for feeding the previously steamed or boiled vegetables into the said casings, it being understood that the bottom opening of the feed hopper registers with the right hand side half of casing 1, and with the left hand side half of casing 1$^a$ only.

Rotatably mounted in the casings 1, 1$^a$ are a plurality of hollow shafts 2, 3, 4, 5, and 2$^a$, 3$^a$, 4$^a$ 5$^a$, respectively, the said shafts being located vertically below one another and provided with a series of radial openings. On each of said shafts are secured four perforated blades 6, 6$^a$ extending the entire length of the shafts lying within the casings and placed at right angles to one another. The radial width of the blades on the shafts 2, 2$^a$ exceeds that of the blades on shafts 3, 3$^a$; the radial width of the latter in turn exceeding that of the blades 4, 4$^a$, and so on. The shafts 2—5 and 2$^a$—5$^a$ respectively are driven continuously and at comparatively low speed by suitable driving gear in such manner that all shafts are rotated with the same angular speed, and that the direction of rotation of any shaft is reverse relative to that of the next one in its vertical row and also to that of the corresponding shaft in the other casing. Further, the construction is such that if the blades on the shaft 2 are vertical and horizontal respectively, those on the shafts 2$^a$, 4 and 4$^a$ assume the same position, the blades on the remaining shafts forming angles of about 45° therewith.

The inner surfaces of the casings 1, 1$^a$ are cylindrical and formed in such manner that the edges of the blades 6, 6$^a$ during a substantial part of their rotation about their shafts are in engagement therewith, and for insuring the required tightness the said edges may be provided with strips of felt or with brushes 7, 7ª.

The exterior walls of the casings 1, 1ª, are provided with a plurality of openings for the connection of air inlet conduits 8—10 and 8ª—10ª respectively, the said openings being arranged somewhat below the level of the corresponding shafts 2—5 and 2ª—5ª respectively. At their bottom side the casings 1, 1ª are in communication with a space 11 the walls of which are provided with a plurality of openings 13 and in which a worm conveyer 12 is rotatably mounted. Vertically below the worm conveyer 12 there is a second worm conveyer 14 the direction of rotation of which is reverse relative to that of the conveyer 12, the arrangement being such that the material discharged from the casings 1, 1ª is conveyed by the worm 12 to a point near one end wall where they fall into the trough of the worm 14 which conveys them in the reverse direction so as to discharge them near the opposite end wall of the apparatus. The walls of the trough for the worm 14 are also provided with openings 13.

The conduits 8—10 and 8ª—10ª all open into the space inclosed by a casing 15 which at its bottom side near 16 is connected with the discharge side of a fan (not shown). Said space contains a plurality of pipes 17 through which steam is allowed to circulate, and mounted in the conduits 8—10 and 8ª—10ª are steam coils 23, 23ª and flap valves 24, 24ª.

The inner walls of the casings 1, 1ª are provided with a plurality of openings arranged opposite the inlets of the conduits 8—10 and 8ª—10ª respectively, said openings, which are adapted to be closed by flap valves 18, 18ª, enabling the spaces inclosed by said casings to be brought into communication with the inclosed space 19 between both casings 1 and 1ª. By means of a pipe 20 the space 19 is connected with the suction side of an exhauster (not shown), a pipe 21 near its bottom serving for draining it.

The casing 15 is inclosed by another casing 22, the interspace being connected at its bottom side with a chimney (not shown), and opening at its top side into the feed hopper 30.

Figure 2:
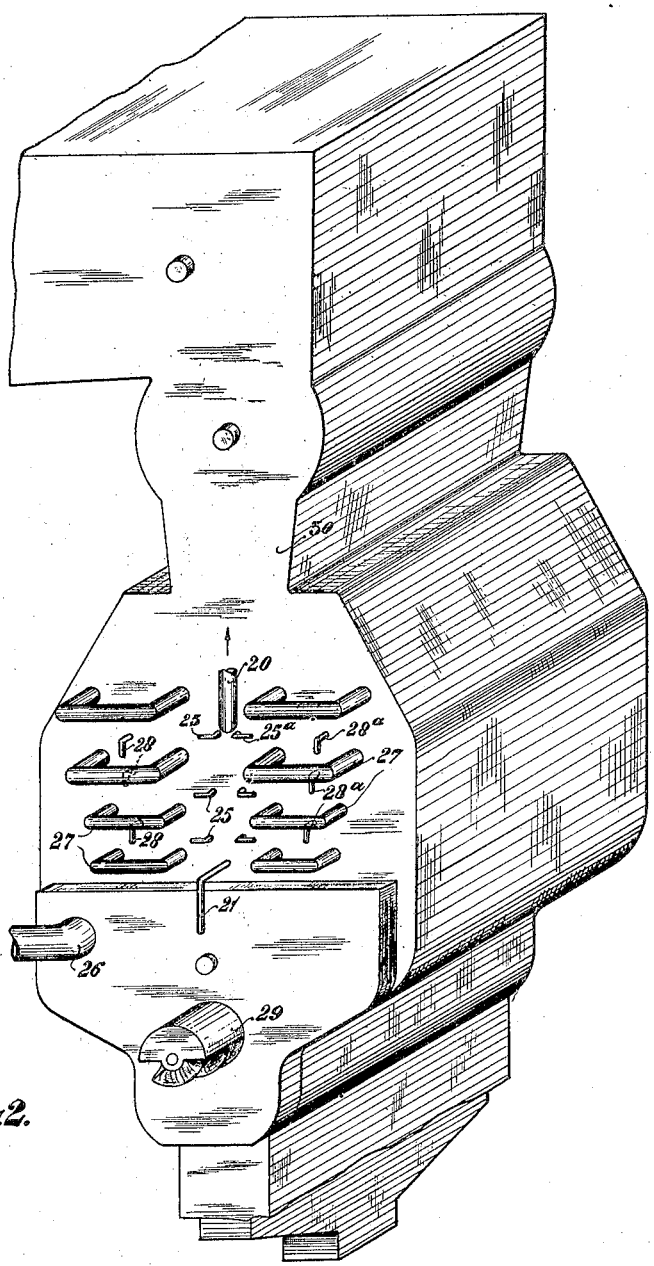

In Fig. 2, the numerals 25, 25ª designate handles for operating the valves 18, 18ª, and 26 is a main for supplying steam to the pipes 17 and the coils 23. The pipes 27 serve for supplying air from the space within the casing 15, and from the conduits 8—10 and 8ª—10ª, into the hollow shafts 2—5 and 2ª—5ª respectively, the handles 28, 28ª being for operating the valves 24, 24ª, and 29 being the outlet of the worm conveyer 14.

Figure 3:
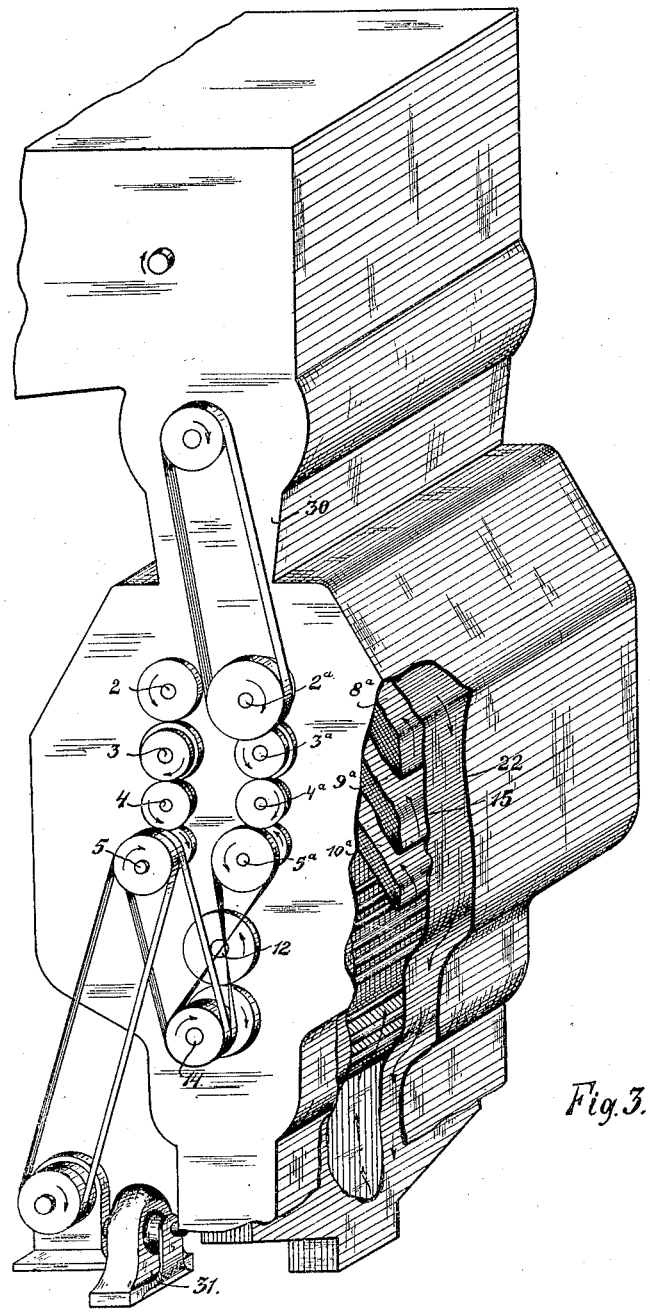

Fig. 3 shows somewhat diagrammatically the transmission gear by which the shafts 2—5 and 2ª—5ª as well as the worm conveyers 12 and 14, are driven by a motor 31, but no detailed description of this gear, is required for clearly understanding the present invention.

The operation of the apparatus is as follows:

The previously steamed or boiled vegetables having a temperature of about 100° C. are fed from the feed hopper 30 into the casings 1, 1ª where they are received on the perforated plates 6, 6ª of the shafts 2, 2ª. Owing to the slow rotary motion of said shafts and to the relative position of the blades on the shafts 2, 2ª and 3, 3ª the vegetables, after having moved through a certain angular distance, will under the influence of their own weight gradually pass on to the blades on the shafts 3, 3ª, thereafter on to the blades on the shafts 4, 4ª, and so on, so that they move through the casing along an undulating path. During this movement they are subjected to the action of the hot air entering through the conduits 8—10 and 8ª—10ª respectively, and direct from the space 11; the heating surface of the steam coils in each of said conduits is to be determined in such manner that the temperature of the air entering the casing 15 at the inlet 16 and heated to about 70° C. by the steam pipes 17 is raised to about 80° C. in the conduits 10, 10ª, to about 90° C. in the conduits 9, 9ª and to about 100° C. in the conduits 8, 8ª. These temperatures may be controlled in any convenient manner, for instance, automatically by means of thermostats, it being understood that the amount of air entering the casings 1, 1ª may be controlled by means of the valves 24, 24ª.

From the foregoing it follows that the air circulating over and through the moist material on the blades of the top shafts 2, 2ª is heated to approximately 100° C. Owing to the fact that the moist vegetables on these blades have themselves said high temperature, it is clear that they can stand the action of this hot air which, as previously stated, is adapted to take up a considerable quantity of moisture.

When the vegetables have reached the blades on the shafts 3, 3ª they have lost part of the moisture originally contained therein, so that they are less adapted to stand the action of hot air; it will be observed, however, that they are here subjected to the action of air of only 90° C. entering through the conduits 9, 9ª.

As the vegetables reach a lower level and, consequently, lose their moisture they move through compartments where the temperature of the drying air is preferably as high as the material is just adapted to stand in connection with its degree of moisture. In this manner the material will have a temperature of about 70° C. when being discharged into the trough of the worm conveyer 12; in this conveyer and in the conveyer 14 any moisture that may have remained in the material is withdrawn by the air of comparatively low temperature circulating therethrough, so that when being discharged at 29 they are perfectly dry and will have cooled down to about the temperature of the atmosphere.

The introduction of hot air through the hollow shafts 2—5 and 2ᵃ—5ᵃ has for its purpose to allow the air to act upon practically every particle of the material to be treated; preferably the temperature of the air blown into these shafts is controlled in the same manner as that of the air introduced by the conduits 8—10 and 8ᵃ—10ᵃ respectively. It should, however, be understood that the circulation of air through the hollow shafts is not essential for carrying out the present invention, so that it may be dispensed with.

The saturated air escapes into the space between the casings 15 and 22, whence it flows to the chimney; it is clear that this very hot air insures an efficient insulation and tends to materially reduce the losses of heat.

By partially opening the valves 18, 18ᵃ air saturated with moisture in the lower compartments of the casings 1, 1ᵃ may be allowed to escape into the space 19 whence it is withdrawn through the pipe 20; the condensed water is drained through the pipe 21.

Apart from the fact that the apparatus described above requires a minimum amount of drying air, it has the advantageous feature that the vegetables moving through the drying space under the influence of their own weight are in no point of their path allowed to fall freely, as they are gradually shoved from the one blade on to the next one; besides, the flow of air is permitted to act upon the material in a continuously varying direction and, therefore, to efficiently dry it, owing to the rotary movement of the blades for supporting the vegetables. Further, as the width of the casings 1, 1ᵃ decreases from top to bottom side, the whole section of these casings remains filled with vegetables notwithstanding the drying-up action of the air, so that all of the air must come into contact with the material.

What I claim as my invention and desire to secure by Letters Patent is:

1. A method of drying steamed or boiled vegetables by air in accordance with the counter-current principle consisting in heating the vegetables to a temperature of approximately 100° C., feeding said vegetables at that temperature into a drier and causing them to slowly move through a space into which at different points between the outlet and the inlet for the vegetables air is introduced with temperatures that gradually increase from the outlet to the inlet.

2. In apparatus of the type referred to, the combination of an open ended casing having cylindrical inner surfaces, a plurality of shafts mounted vertically below one another in said casing and adapted to rotate at equal angular speeds but alternately in the one and the other direction, a plurality of radial perforated blades mounted on each of said shafts in such manner that the edges of said blades during part of their rotation glide along the cylindrical surfaces of said casing and move within the cylindrical space inclosed by the path of the edges of the blades on the next higher and (or) lower shaft, a plurality of hot air inlet conduits opening into the said casing between the inlet and the outlet of the vegetables, a space in communication with the said casing through the bottom opening of the latter, with conveying means mounted in said space and adapted to discharge the material from the apparatus.

3. In apparatus of the type referred to, the combination of an open ended casing having cylindrical inner surfaces, a plurality of shafts mounted vertically below one another in said casing and adapted to rotate at equal angular speeds but alternately in the one and the other direction, a plurality of radial perforated blades mounted on each of said shafts in such manner that the edges of said blades during part of their rotation glide along the cylindrical surfaces of said casing and move within the cylindrical space inclosed by the path of the edges of the blades on the next higher and (or) lower shaft, a plurality of hot air inlet conduits opening into the said casing between the inlet and the outlet of the vegetables, means in said conduits for heating the air flowing therethrough, a space in communication with the said casing through the bottom opening of the latter, with conveying means mounted in said space and adapted to discharge the material from the apparatus.

4. In apparatus of the type referred to, the combination of an open ended casing having cylindrical inner surfaces, a plurality of shafts mounted vertically below one another in said casing and adapted to rotate at equal angular speeds but alternately in the one and the other direction, a plurality of radial perforated blades mounted on each of said shafts in such manner that the edges of said blades during part of their rotation glide along the cylindrical surfaces of said casing and move within the cylindrical space inclosed by the path of the edges of the blades on the next higher and (or) lower shaft, a plurality of hot air inlet conduits opening into the said casing between the inlet and the outlet of the vegetables, means in said conduits for heating the air flowing therethrough, means for controlling the individual temperatures of the air flowing through said conduits, a space in communication with the said casing through the bottom opening of the latter, with conveying means mounted in said space and adapted to discharge the material from the apparatus.

5. In apparatus of the type referred to, the combination of a vertical open ended casing tapering from top to bottom side and having cylindrical inner surfaces, a plurality of shafts mounted vertically below one another in said casing and adapted to rotate at equal angular speeds but alternately in the one and the other direction, a plurality of radial perforated blades mounted on each of said shafts in such manner that the edges of said blades during part of their rotation glide along the cylindrical surfaces of said casing and move within the cylindrical space inclosed by the path of the edges of the blades on the next higher and (or) lower shaft, a plurality of hot air inlet conduits opening into the said casing between the inlet and the outlet of the vegetables, a space in communication with the said casing through the bottom opening of the latter, with conveying means mounted in said space and adapted to discharge the material from the apparatus.

6. In apparatus of the type referred to, the combination of an open ended casing having cylindrical inner surfaces, a plurality of shafts mounted vertically below one another in said casing and adapted to rotate at equal angular speeds but alternately in the one and the other direction, a plurality of radial perforated blades mounted on each of said shafts in such manner that the edges of said blades during part of their rotation glide along the cylindrical surfaces of said casing and move within the cylindrical space inclosed by the path of the edges of the blades on the next higher and (or) lower shaft, a plurality of hot air inlet conduits opening into the said casing between the inlet and the outlet of the vegetables, outlet openings provided opposite the inlet openings of said conduits and connected with means for drawing air from said casing, means for controlling the amount of air flowing through said outlet openings, a space in communication with the said casing through the bottom opening of the latter, with conveying means mounted in said space and adapted to discharge the material from the apparatus.

7. In apparatus of the type referred to the combination of an open ended casing having cylindrical inner surfaces, a plurality of hollow shafts mounted vertically below one another in said casing and adapted to rotate at equal angular speeds but alternately in the one and the other direction, radial openings in said shafts, means for introducing hot air into said shafts, a plurality of radial perforated blades mounted on each of said shafts in such manner that the edges of said blades during part of their rotation glide along the cylindrical surfaces of said casing and move within the cylindrical space inclosed by the path of the edges of the blades on the next higher and (or) lower shaft, a plurality of hot air inlet conduits opening into the said casing between the inlet and the outlet of the vegetables, a space in communication with the said casing through the bottom opening of the latter, with conveying means mounted in said space and adapted to discharge the material from the apparatus.

8. In apparatus of the type referred to, the combination of an open ended casing having cylindrical inner surfaces, a plurality of shafts mounted vertically below one another in said casing and adapted to rotate at equal angular speeds but alternately in the one and the other direction, a plurality of radial perforated blades mounted on each of said shafts in such manner that the edges of said blades during part of their rotation glide along the cylindrical surfaces of said casing and move within the cylindrical space inclosed by the path of the edges of the blades on the next higher and (or) lower shaft, a plurality of hot air inlet conduits opening into the said casing between the inlet and the outlet of the vegetables, a space in communication with the said casing through the bottom opening of the latter, with means for conveying material falling from the blades on the lowermost of said shafts through a space wherein air of comparatively low temperature is allowed to circulate, and adapted to discharge the material from the apparatus.

9. In apparatus of the type referred to, the combination of an open ended casing having cylindrical inner surfaces, a plurality of shafts mounted vertically below one another in said casing and adapted to rotate at equal angular speeds but alternately in the one and the other direction, a plurality of radial perforated blades mounted on each of said shafts in such manner that the edges of said blades during part of their rotation glide along the cylindrical surfaces of said casing and move within the cylindrical space inclosed by the path of the edges of the blades on the next higher and (or) lower shaft, a plurality of hot air inlet conduits opening into the said casing between the inlet and the outlet of the vegetables, a space in communication with the said casing through the bottom opening of the latter, conveying means mounted in said space and adapted to discharge the material from the apparatus, a jacket inclosing said casing, with means for allowing the drying air drawn off at the top side of the said casing to flow downward through said jacket.

In testimony whereof I have affixed my signature in presence of two witnesses.

DOMINICUS JOSEPHUS PENNOCK.

Witnesses:
    H. NEIKEYL,
    HAUTE FÉBEL.

Copies of this patent may be obtained for five cents each, by addressing the "Commissioner of Patents, Washington, D. C."